Patented May 4, 1937

2,079,499

UNITED STATES PATENT OFFICE 2,079,499

MONOAZO DYESTUFFS

Richard Fleischhauer, Frankfort-on-the-Main-Fechenheim, Germany, assignor to General Aniline Works, Inc., New York, N. Y., a corporation of Delaware No Drawing. Application August 5, 1936, Serial No. 94,343. In Germany August 7, 1935

5 Claims. (Cl. 260—44.6)

The present invention relates to valuable new monoazo dyestuffs, more particularly to those of the general formula:

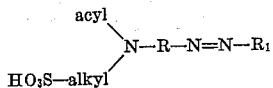

wherein R means a radicle of the benzene series and $R_1$ means a coupling component.

The new dyestuffs are obtained by combining the diazo compounds of aromatic amines of the general formula:

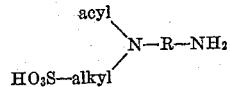

(wherein R means a radicle of the benzene series) with a coupling component.

The diazo components employed for the manufacture of the new monoazo dyestuffs have not been described however. They may be obtained by acylating nitrophenyl-alkylamino-ω-sulfonic acids and by a subsequent reduction or by acylation, subsequent nitration and reduction of phenyl-alkylamino-ω-sulfonic acids. The said nitrophenyl-alkylamino-ω-sulfonic acids may be produced for example by condensing nitrochlorobenzene-sulfonic acids with aminoalkyl-sulfonic acids, for example taurine, and splitting off the sulfonic acid group attached to the aromatic radicle by heating with dilute sulfuric acid, in which operation the ω-sulfonic acid group remains unchanged. Or the nitrophenyl-alkylamino-ω-sulfonic acids may be obtained by treating phenyl-alkylamino-ω-sulfonic acids, for example phenyl-taurine, with acylating agents and nitrating and subsequently reducing the products thus obtained.

The new dyestuffs are particularly useful for dyeing animal fibers. They are distinguished from the analogous dyestuffs not containing a sulfonic acid group in the alkyl radicle by greater solubility, better tinctorial power and partially better fastness to light and seawater.

In order to further illustrate my invention the following examples are given, the parts being by weight and all temperatures in centigrade degrees; but it is, however, to be understood that my invention is not limited to the particular products nor reacting conditions mentioned therein.

Example 1

25,8 parts of 1-(N-ω-sulfoethyl-N-acetyl-amino)-4-amino-benzene are diazotized in the usual manner and the diazo solution obtained is combined in a slightly acid medium with 24 parts of 2-amino-8-naphthol-6-sulfonic acid. The dyestuff formed of the formula:

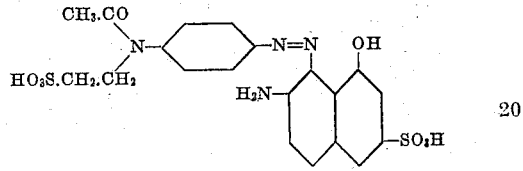

is isolated and dried. It forms a red powder, soluble in water, dyeing wool and silk yellowish red shades of very good fastness to light and of good levelling power.

Dyestuffs of similar properties are obtained by employing 1-(N-ω-sulfoethyl-N-acetyl-amino)-4-amino-benzene containing further substituents in its benzene nucleus, for example the 1-(N-ω-sulfoethyl-N-acetyl-amino)-4-amino-3-methyl-benzene.

Example 2

The diazo solution obtained according to Example 1 is combined with 35 parts of 2-(4'-methoxyphenyl)-amino-8-naphthol-6-sulfonic acid in a medium containing acetic acid. The dyestuff formed of the formula:

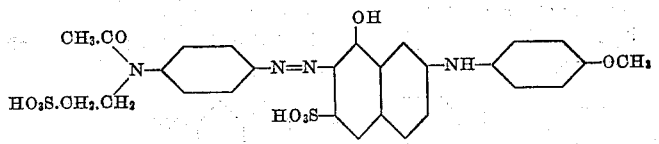

dyes wool deep brown shades, fast to light and of good levelling power.

When the combination is performed in the presence of sodium carbonate a more yellowish brown dyestuff of similar properties is obtained.

Example 3

The diazo solution obtained according to Example 1 is combined in the presence of sodium carbonate with 26 parts of 1-(2'-chloro-5'-sulfophenyl)-3-methyl-5-pyrazolone. The dyestuff formed of the formula:

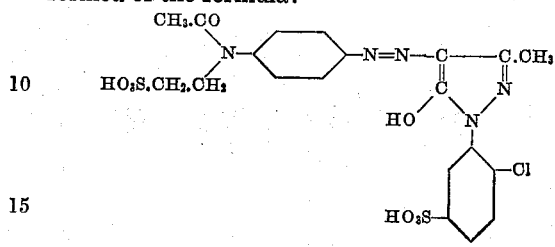

represents a yellow powder, soluble in water, dyeing wool greenish yellow shades, fast to light and of good levelling power.

Dyestuffs of similar good properties are obtained by employing other pyrazolone compounds as coupling components.

Example 4

The diazo solution obtained according to Example 1 is combined in the presence of sodium acetate with 35 parts of 1-benzoylamino-5-naphthol-7-sulfonic acid. The dyestuff obtained of the formula:

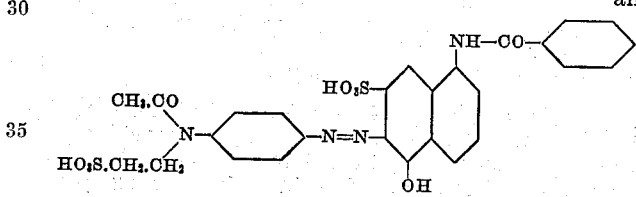

is isolated and dried. It represents a red powder, soluble in water, dyeing wool bright red shades of very good fastness properties and good levelling power.

Dyestuffs of similar properties and of more yellowish or bluish shades are obtained by employing other acylamino-naphthol-mono- or -disulfonic acids or naphthol-mono- or -disulfonic acids.

Analogous dyestuffs are obtained by employing diazo compounds containing instead of the acetyl-group other acyl radicals such as for example chloroacetyl, methoxyacetyl, phenoxyacetyl, benzoyl and toluene sulfone, or containing instead of the ω-sulfo-ethyl group other ω-sulfoalkyl groups such as for example ω-sulfopropyl.

Example 5

32 parts of 1-(N-ω-sulfoethyl-N-benzoylamino)-4-aminobenzene (which is prepared by treating ω-sulfoethyl-aminobenzene (phenyl-taurine) with benzoylchloride, nitrating the compound thus obtained, for example in glacial acetic acid, and reducing the nitro compound obtained) are diazotized in the usual manner. The diazo solution obtained is allowed to run into a solution of 32 parts of 2-phenylamino-8-naphthol-6-sulfonic acid containing an excess of sodium carbonate. The dyestuff formed of the formula:

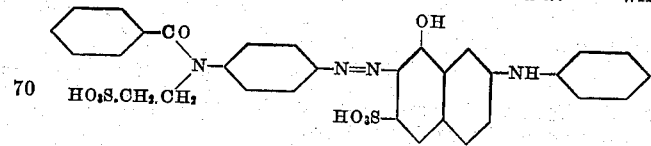

is isolated and dried. It is a dark powder, easily soluble in water, dyeing wool and silk very deep brown shades of very good fastness properties.

Example 6

32 parts of 1-(N-ω-sulfoethyl-N-benzoylamino)-4-aminobenzene are diazotized in the usual manner. The diazo solution obtained is allowed to run into a solution of 29 parts of 2-acetyl-amino-8-naphthol-6-sulfonic acid containing an excess of sodium acetate. The dyestuff formed of the formula:

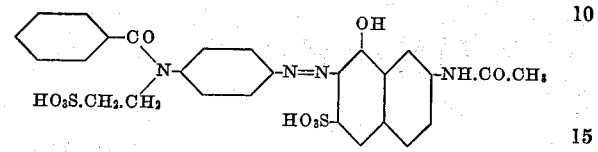

is isolated and dried. It is a red powder, easily soluble in water, dyeing wool and silk from an acid bath bright red shades of very good fastness properties.

I claim:

1. The monoazo dyestuffs of the general formula:

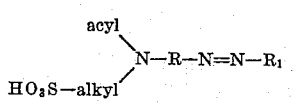

wherein R means a radicle of the benzene series and $R_1$ means a coupling component, which dyestuffs yield on fibers, especially wool or silk, various shades of very good fastness properties, especially to light and seawater, and of good levelling power.

2. The monoazo dyestuffs of the general formula:

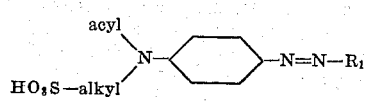

wherein $R_1$ means a coupling component, which dyestuffs yield on fibers, especially wool or silk, various shades of very good fastness properties, especially to light and seawater, and of good levelling power.

3. The monoazo dyestuff of the formula:

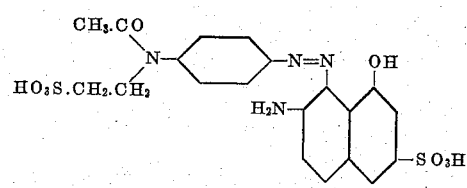

which dyestuff represents a red powder, soluble in water, dyeing wool and silk yellowish red shades of very good fastness to light and of good levelling power.

4. The monoazo dyestuff of the formula:

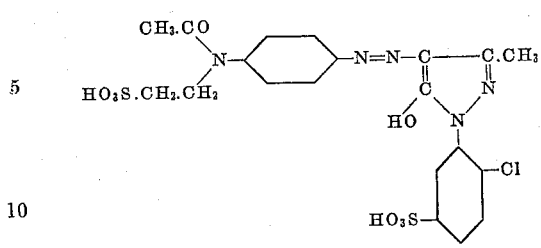

which dyestuff represents a yellow powder, soluble in water, dyeing wool greenish yellow shades, fast to light and of good levelling power.

5. The monoazo dyestuff of the formula:

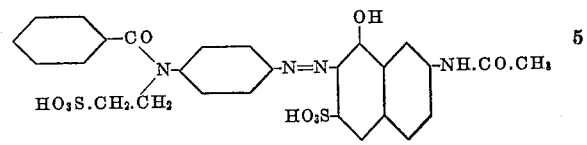

which dyestuff represents a red powder, easily soluble in water, dyeing wool and silk bright red shades of very good fastness properties.

RICHARD FLEISCHHAUER.